United States Patent [19]

Groenenboom et al.

[11] Patent Number: 4,840,724
[45] Date of Patent: Jun. 20, 1989

[54] PROCESS FOR CRACKING HYDROCARBON FEEDS

[75] Inventors: Cornelis J. Groenenboom, Driehuis; Peter A. Wieringa, Naarden, both of Netherlands

[73] Assignee: Akzo NV, Arnhem, Netherlands

[21] Appl. No.: 296,893

[22] Filed: Jan. 12, 1989

Related U.S. Application Data

[63] Continuation of Ser. No. 920,434, Oct. 20, 1986, abandoned.

[30] Foreign Application Priority Data

Oct. 18, 1985 [NL] Netherlands ................ 8502851

[51] Int. Cl.$^4$ ................................ C10G 11/05
[52] U.S. Cl. ........................ 208/120; 208/121; 208/149; 502/68; 502/79
[58] Field of Search .............. 208/120, 121, 149; 502/68, 79

[56] References Cited

U.S. PATENT DOCUMENTS

| | | | |
|---|---|---|---|
| 3,210,267 | 10/1965 | Plank et al. | 208/120 |
| 3,252,757 | 5/1966 | Granquist | 423/329 |
| 3,252,889 | 5/1966 | Capell et al. | 208/120 |
| 3,271,418 | 9/1966 | Plank et al. | 208/120 |
| 3,293,192 | 12/1966 | Maher et al. | 502/73 |
| 3,506,400 | 4/1970 | Eberly, Jr. et al. | 423/328 |
| 3,609,103 | 9/1971 | Galdrow et al. | 502/68 |
| 3,676,330 | 7/1972 | Plank et al. | 502/64 |
| 3,743,594 | 7/1973 | Mulaskey | 208/216 R |
| 3,838,041 | 9/1974 | Sawyer et al. | 208/120 |
| 3,892,655 | 7/1975 | Hickson | 208/120 |
| 4,182,693 | 1/1980 | Gladrow | 502/64 |
| 4,193,454 | 3/1980 | Goldstein | 208/120 |
| 4,197,186 | 4/1980 | Short et al. | 502/60 |
| 4,266,672 | 5/1981 | Van Nordstrand | 208/120 |
| 4,343,723 | 8/1982 | Rogers et al. | 502/68 |
| 4,465,588 | 8/1984 | Occelli et al. | 208/120 |
| 4,465,779 | 8/1984 | Occelli et al. | 502/63 |
| 4,466,884 | 8/1984 | Occelli et al. | 208/113 |
| 4,519,897 | 5/1985 | DeJong | 208/120 |
| 4,569,754 | 2/1986 | Moore | 208/251 R |
| 4,708,786 | 11/1987 | Occelli | 208/120 |

FOREIGN PATENT DOCUMENTS

| | | | |
|---|---|---|---|
| 0112601 | 7/1984 | European Pat. Off. | 208/120 |
| 1514417 | 6/1978 | United Kingdom | 502/79 |

*Primary Examiner*—Anthony McFarlane
*Attorney, Agent, or Firm*—Oliff & Berridge

[57] ABSTRACT

There is disclosed a process for cracking a hydrocarbon feed in the presence of a fluidizable cracking catalyst composition containing a sepiolite, an ultrastable Y-zeolite and a matrix material, characterized in that the hydrocarbon feed is metal-free.

8 Claims, No Drawings

PROCESS FOR CRACKING HYDROCARBON FEEDS

This is a continuation of application Ser. No. 920,434 filed Oct. 20, 1986, now abandoned.

The invention relates to a process for cracking a hydrocarbon feed in the presence of a fluidizable cracking catalyst composition containing a sepiolite, an ultrastable Y-zeolite and a matrix material.

A process of the type indicated above is disclosed in European Pat. No. 112,601. It describes a process in which metal-containing feeds are cracked with a catalyst which in addition to a matrix contains non-dispersed sepiolite and a crystalline alumino silicate. Preference is given then to the use of X- or Y-zeolites or ultrastable sieves.

The sepiolite serves to render the catalyst resistant to metals from metal-containing hydrocarbon feeds. As discussed in said patent application, a disadvantage to sepiolite is that it may impair the crystallinity of the zeolite during regeneration of the catalyst at high temperatures. As a result the performance of the catalyst will decrease. Use of sepiolite in a zeolitic cracking catalyst in a process in which resistance to metal of the catalyst is of little importance is therefore not obvious.

It has now been found that it may yet be of advantage to make use of particular sepiolite-containing zeolitic cracking catalysts. The invention consists in that in the above well-known process use is made of a metal-free hydrocarbon feed.

For, it has been found that in the present process the presence in the catalyst matrix of sepiolite in addition to the ultrastable Y-zeolite invariably leads to improved activity and selectivity of the catalyst composition. Such improvements were not observed at all when use was made of catalysts which unlike the present catalysts contain a Y-zeolite.

By metal-free hydrocarbon feeds is meant here that these feeds at most contain traces of metal (Ni and V). Generally, the present hydrocarbon feeds will contain less than 0.1 ppm of metal and in any case less than 1 ppm.

It should be added that U.S. Pat. No. 4,266,672 describes a process which, as the process in European Pat. No. 0 112 601, is directed to cracking metal-containing feeds. The catalysts used in this process contain sepiolite in the form of dispersed fibre like rods. A zeolite may be incorporated into the matrix of the catalyst. No mention is made of ultrastable zeolites.

U.S. Pat. Nos. 4,465,588 and 4,465,779 relate to a catalyst and its use for cracking feeds containing a large proportion of metal. The catalyst is composed of a mixture of catalytically active particles which preferably contain a zeolite, more particularly an X-zeolite or Y-zeolite, and other particles which contain a magnesium compound, such as sepiolite.

A description of sepiolite is given in Clay Mineralogy, R. E. Grim, Mc. Graw-Hill, 2nd Ed. 1968, and in The Electron-Optical Investigation of Clays, J. A. Gard, Ed. Mineralogical Society, 1971.

The term sepiolite used in the description of the present invention also refers to sepiolite related minerals such as attapulgite.

Sepiolite usually occurs in the form of bundles of generally parallelly oriented rods. It is preferred that the sepiolite should be used in this non-dispersed form. Optionally the sepiolite should then be ground into such particles that the non-dispersed form is essentially maintained. Alternatively, this sepiolite may optionally be so treated that the separate rods are no longer in contact with each other. This dispersing treatment may be effected by very intensive mixing, kneading, etc., of the sepiolite. These treatments, however, are time consuming, costly and the performance of the final catalyst is not optimal.

In the preparation of the catalysts for the present process the sepiolite may be added directly to a suspension, gel slurry or sol of one or more of the catalyst components.

Alternatively, the sepiolite may first be formed into an (acid) aqueous suspension and then be added to one or more other components. Ultrastable Y-zeolites essentially differ from the Y-zeolites, from which they may be prepared by a thermal treatment. During the ultrastabilizing process alumina is released from the zeolite crystal lattice and replaced by silica. At the same time the cell constant of the crystal lattice generally decreases to 24.55–24.20 Å and often to 24.50–24.35 Å with increasing thermal stability of the zeolite. The zeolite will then be more resistant to the high temperatures (700° to 800° C.) which are nowadays employed in the generation of fluidizable cracking catalysts. Suitable methods of preparing ultrastable Y-zeolites are described in U.S. Pat. No. 3,293,192 and in Society of Chemical Engineering (London) Monograph Molecular Sieves, p. 186 (1968) by C. V. Mc. Daniel and P. K. Maher. Optionally, the ultrastable Y-sieve may be aftertreated, for instance by extraction with acid, for the purpose of removing the alumina, which is released from the crystal lattice during ultrastabilization. Such an aftertreatment is described in U.S. Pat. No. 3,506,400 and NL No. 7,604,264. The ready ultrastable Y-zeolite may optionally be treated with solutions containing rare earth metal ions and/or ammonium or hydrogen ions. The ready catalyst generally contains less than 1% by weight and preferably less than 0.5% by weight of sodium.

As matrix material can be used all well-known matrix materials suitable for embedding zeolitic crystalline aluminosilicates, such as silica, alumina, magnesia, zirconia, titania, boria, aluminium chlorohydrol and mixtures thereof. Preference is given to silica, silica-alumina and alumina.

In addition to the sepiolite and the ultrastable Y-zeolite other components may be incorporated into the matrix material. As examples thereof may be mentioned clays such as kaolin, bentonite, layered clays discussed in U.S. Pat. Nos. 3,252,757, 3,252,889 and 3,743,594, montmorillonite clays, etc.

To augment the octane number of the petrol fraction produced, alumina particles as described in U.S. Pat. No. 4,182,693 may be incorporated into the catalyst composition. Moreover, the catalyst composition may contain usual amounts of one or more passivators such as antimony, tin, and the like. They particularly serve to prevent excessive formation of hydrogen during the cracking process.

To reduce $SO_x$ emission and to promote the conversion of $CO/CO_2$ 0.05–1000 ppm of an oxidation promoting metal or metal compound may be incorporated into the present composition.

The cracking catalyst composition generally contains 0.05–1000 ppm of an oxidation promoting metal or metal compound.

Suitable for that purpose are noble metals or compounds thereof of group VIII of the periodic system, such as Pt, Pd, Ir, Rh, Os and Ru. Also suitable to that end are rare earth metals or compounds thereof. Examples of suitable oxidation promoters also include Cr and Cu, and compounds thereof. It is preferred that use should be made of 0.1 to 100 ppm, more particularly 0.1–50 ppm, of a noble metal of group VIII. Most preference is given to the incorporation into the catalyst of 0.1–10 ppm of platinum or palladium. These metals may be incorporated in the catalyst in a known manner, for instance by impregnation with a corresponding salt solution.

The components of the catalyst composition may be combined with the matrix material in a manner known in itself. Suitable methods of preparation are described, among other places, in U.S. Pat. Nos. 3,609,103 and 3,676,330. For instance, the sepiolite and the ultrastable Y-zeolite may be combined with the gelled matrix material. After proper mixing and subsequent spray drying the ready catalyst composition is obtained. Alternatively, the various components may be added to a matrix material in the form of a sol. This sol bonding agent can be formed into a gel before or during spray drying. The latter procedure is to be preferred in that it leads to catalyst compositions having a relatively high density. Thus, apparent densities higher than 0.5 g/ml, preferably higher than 0.7 g/ml are simple to realize. Preferably the sepiolite and the ultrastable Y-zeolite are collectively incorporated in one and the same matrix.

A suitable catalyst composition according to the present invention comprises 5–70, preferably 20–40 percent by weight of ultrastable Y-zeolite and 5–70, preferably 20–50, more particularly 20–30 percent by weight of sepiolite, which two components are embedded in 10–90 percent by weight of matrix material. The matrix preferably contains 10–30% silica, silica-alumina and/or alumina and 5–85, especially 20–50 percent by weight of clay. It is preferred that the ultrastable Y-zeolite should be exchanged for rare earth metal ions and/or ammonium or hydrogen ions. As matrix material there is preferably used a silica, silica-alumina or alumina formed into a gel by spray drying the total composition. Optionally, the catalyst composition may contain up to for instance 10% by weight of a non-ultrastabilized Y-zeolite, which may have been exchanged for rare earth metal ions. Particularly in uses requiring a reduction of $SO_x$ emission it is preferred that into the catalyst composition there should be incorporated 0.1–10 ppm of platinum.

The cracking catalyst composition may optionally consist of a physical mixture of:
a. catalytically active particles which contain ultrastable Y-zeolite embedded in a matrix material, and
b. catalytically less active particles which contain sepiolite embedded in a matrix material.

This embodiment of the invention has the advantage that the amount of sepiolite to be added can be adapted in a simple way to the feed to be cracked.

Suitable is a physical mixture in which:
a. the catalytically active particles contain 10–80, preferably 30–50 percent by weight of ultrastable Y-zeolite, 5–60, preferably 10–30 percent by weight of silica, silica-alumina or alumina and 5–85, preferably 20–50 percent by weight of clay, and
b. the catalytically less active particles contain 10–80, preferably 20–60 percent by weight of sepiolite, and 10–90, preferably 10–30 percent by weight of silica, silica-alumina or alumina, and optionally, 10–80 percent by weight of clay.

Also in this mixture the silica, silica-alumina or alumina in the catalytically active and/or less active particles preferably consists of silica, silica-alumina or alumina formed into a gel by spray drying the respective particles.

The catalyst composition is suitable for cracking hydrocarbon feeds which are metal-free, i.e. contain at most traces of metal and in any case less than 1 ppm of metal (Ni and V), such as vacuum gas oils having a density of 850–950 kg/m³ and a boiling range of 300°–600° C.

Catalytic cracking of hydrocarbon feeds using a fluidizable cracking catalyst is normally carried out at a temperature of 375°–650° C., more particularly 460°–560° C. The pressure applied is generally in the range of from 1 to 7 atmospheres, more particularly a gauge pressure of from 1 to 3 atmospheres is applied. Regeneration of the cracking catalyst in air is generally carried out at 540°–825° C., more particularly 700°–750° C.

EXAMPLE 1

The cracking catalyst compositions mentioned in the Table were prepared by adding the various components to an acid silica-alumina sol and passing the resulting mixture through a colloid mill and forming it into a gel by spray drying. The activity and the selectivity of the ready catalysts were measured in conformity with the well known ASTM MAT test described in for instance the book on the Ketjen Symposium 1982 at Amsterdam in the Netherlands, pp. 82–84.

Reference catalyst I contains ultrastable Y-zeolite but no sepiolite (cf. Table 1). Catalyst II differs from catalyst I in that the kaolin was partially replaced with non-dispersed sepiolite.

The test results show that catalyst II leads to a higher conversion and gasoline yield, a lower proportion of residue and that furthermore the coke formation is low considering the high feedstock conversion. The data on catalyst III, IV and V further illustrate the invention.

TABLE 1

| Cracking catalyst composition | I | II | III | IV | V |
|---|---|---|---|---|---|
| ultrastable Y-zeolite (%) | 25* | 25* | 25** | 25** | 25** |
| sepiolite (non-dispersed) (%) | — | 20 | 20 | 20 | 20 |
| kaolin (%) | 55 | 35 | 15 | 25 | 25 |
| silica/alumina (97%/3%) | 20 | 20 | 20 | 20 | 20 |
| alumina particles (%) | — | — | 20 | 10 | — |
| $PV_{H2O}$ (ml/g) | 0.30 | 0.34 | 0.39 | 0.34 | 0.37 |
| ABD (600° C.: g/ml) | 0.77 | 0.72 | 0.63 | 0.70 | 0.67 |
| $Na_2O$ | 0.10 | 0.11 | 0.29 | 0.22 | 0.22 |
| $RE_2O_3$ (%) | — | — | — | 1.1 | 1.1 |
| Test results MAT-795° C.-test | | | | | |
| conversion (%) | 47.2 | 53.7 | 60.4 | 59.6 | 57.0 |
| K | 10.8 | 13.9 | 18.3 | 17.9 | 15.9 |
| gas total (%) | 8.1 | 11.4 | 13.4 | 11.7 | 11.2 |
| propene (%) | 2.0 | 2.8 | 3.4 | 2.9 | 2.8 |
| butene (%) | 3.5 | 4.8 | 5.2 | 4.4 | 4.2 |
| gasoline (%) | 37.7 | 40.7 | 43.7 | 45.2 | 44.4 |
| LCO (%) | 25.3 | 23.7 | 25.1 | 24.2 | 25.2 |
| residue (%) | 27.5 | 22.6 | 14.6 | 16.2 | 17.8 |
| coke (%) | 1.4 | 1.6 | 3.2 | 2.7 | 1.6 |

*cell constant: 24.37Å
**cell constant: 24.54Å

EXAMPLE 2

Catalyst compositions VI and VII both contain ultrastable Y-zeolite and sepiolite. The sepiolite in composition VI is nondispersed. In the case of the catalyst composition VIII the sepiolite was dispersed by milling it to a very high degree in a Dynomill before adding it to the other catalyst components.

The performance of the two catalyst compositions was determined in the MAT test. The results in Table 2 show that the use of non-dispersed sepiolite results in a higher conversion and higher gasoline yield.

TABLE 2

| Cracking catalyst composition | VI | VII |
|---|---|---|
| ultrastable Y-zeolite (%)* | 30 | 30 |
| sepiolite (non-dispersed) (%) | 20 | — |
| sepiolite (dispersed) (%) | — | 20 |
| kaolin (%) | 30 | 30 |
| silica/alumina (97%/3%) | 20 | 20 |
| $PV_{H_2O}$ (ml/g) | 0.35 | 0.31 |
| ABD (600° C.; g/ml) | 0.69 | 0.72 |
| $Na_2O$ (%) | 0.34 | 0.26 |
| Test results MAT-795° C.-test | | |
| conversion (%) | 57.6 | 50.4 |
| K | 16.3 | 12.2 |
| gas total (%) | 10.8 | 9.8 |
| propene (%) | 2.7 | 2.5 |
| butene (%) | 4.5 | 4.2 |
| gasoline (%) | 45.2 | 39.4 |
| LCO (%) | 23.5 | 24.6 |
| residue (%) | 18.9 | 25.0 |
| coke (%) | 1.6 | 1.3 |

*cell constant: 24.54Å

EXAMPLE 3

Unlike the catalyst composition of the invention, catalyst compositions VIII and IX contain no ultrastable Y-zeolite but Y-zeolite. Composition IX differs from composition VIII in that it contains sepiolite.

The performance of the two catalyst compositions was determined in the MAT-test. The results in Table 3 show that contrary to when use is made of the combination with sepiolite in the catalyst of the invention, the use here of the combination with sepiolite has a negative effect on the cracking of metal-free feeds.

TABLE 3

| Cracking catalyst composition | VIII | IX |
|---|---|---|
| Y-zeolite (%)* | 25 | 25 |
| sepiolite (non-dispersed) (%) | — | 20 |
| kaolin (%) | 55 | 35 |
| silica/alumina (97%/3%) | 20 | 20 |
| $PV_{H_2O}$ (ml/g) | 0.25 | 0.32 |
| ABD (600° C.; g/ml) | 0.80 | 0.76 |
| $Na_2O$ (%) | 0.46 | 0.43 |
| $RE_2O_3$ (%) | 3.8 | 4.2 |
| Test results MAT-795° C.-test | | |
| conversion (%) | 65.7 | 59.9 |
| K | 23.1 | 18.0 |
| gas total (%) | 15.0 | 12.8 |
| propene (%) | 3.3 | 2.9 |
| butene (%) | 3.3 | 3.4 |
| gasoline (%) | 46.0 | 43.4 |
| LCO (%) | 21.0 | 22.0 |
| residue (%) | 13.3 | 18.0 |
| coke (%) | 2.4 | 3.6 |

*cell constant: 24.73Å

We claim:

1. A cracking process comprising cracking a metal-free hydrocarbon feed in the presence of a fluidizable cracking catalyst composition containing a sepiolite, an ultrastable Y-zeolite, a clay selected from the group consisting of kaolin, bentonite, a layered clay and a montmorillonite clay, and a matrix material.

2. A process according to claim 1, characterized in that the sepiolite, the ultrastable Y-zeolite, and the clay are collectively incorporated in a matrix.

3. A process according to claim 2, characterized in that the sepiolite is present in the cracking catalyst composition in an amount of 5 to 70 percent by weight.

4. A process according to claim 3, characterized in that the sepiolite is present in the cracking catalysts composition in an amount of 20 to 30 percent by weight.

5. A process according to claim 1, characterized in that the ultrastable Y-zeolite is present in the cracking catalyst composition in an amount of 5 to 70 percent by weight.

6. A process according to claim 5, characterized in that the ultrastable Y-zeolite is present in the cracking catalyst composition in an amount of 20 to 40 percent by weight.

7. A process according to claim 1, characterized in that the sepiolite is non-dispersed.

8. A process according to claim 1, characterized in that the clay is kaolin.

* * * * *

UNITED STATES PATENT AND TRADEMARK OFFICE
CERTIFICATE OF CORRECTION

PATENT NO.   :   4,840,724
DATED        :   June 20, 1989
INVENTOR(S)  :   Cornelis J. GROENENBOOM et al It is certified that error appears in the above-identified patent and that said Letters Patent is hereby corrected as shown below:

IN THE SPECIFICATION:

Col. 1, line 46, change "0 112 601" to --112,601--; line 59, change "Mc. Graw-Hill" to --McGraw-Hill--.

Col. 2, line 29, change "Mc. Daniel" to --McDaniel--.

Signed and Sealed this

Twenty-fourth Day of April, 1990

Attest:

HARRY F. MANBECK, JR.

*Attesting Officer*          *Commissioner of Patents and Trademarks*